228-222
1/6/87 03 ! 000,187

United States Statutory Invention Registration [19]

[11] Reg. Number: H187
[43] Published: Jan. 6, 1987

Blanchard

[54] SOLDERING METHOD FOR CABLE CONNECTORS

[75] Inventor: Linden O. Blanchard, North Andover, Mass.

[73] Assignee: The United States of America as represented by the Secretary of the Air Force, Washington, D.C.

[21] Appl. No.: 592,034

[22] Filed: Mar. 21, 1984

[51] Int. Cl.[4] ..... B23K 31/02; B23K 35/38
[52] U.S. Cl. ..... 228/222; 228/242
[58] Field of Search ..... 228/214, 222, 240, 242, 228/241; 134/11, 31

[56] References Cited

U.S. PATENT DOCUMENTS

| | | | |
|---|---|---|---|
| 2,450,120 | 9/1948 | Cate | 113/59 |
| 3,355,078 | 11/1967 | Smith | 228/44 |
| 3,358,751 | 12/1967 | Berwald et al. | 165/185 |
| 3,616,533 | 11/1971 | Heap et al. | 228/222 |
| 4,187,974 | 2/1980 | Mahajan | 228/242 |
| 4,295,596 | 10/1981 | Doten et al. | 228/180 A |

OTHER PUBLICATIONS

VPS Vapor Phase Reflow Soldering", Service Bulletin 16, 3M Company, released about Apr. 1983.
Soldering Technique Eliminates Serious Charge Buildup", article in Control Engineering, Apr. 1983, vol. 30, Nov. 4, p. 53.
"Phase-Four Production Systems for Vapor Phase Soldering", product description from HTC, Concord, Mass.

*Primary Examiner*—Thomas H. Tarcza
*Assistant Examiner*—Linda J. Wallace
*Attorney, Agent, or Firm*—Donald J. Singer; Charles E. Bricker

[57] ABSTRACT

The heat-sensitive components of cables and cable connectors are protected from overheating during vapor phase soldering by enclosing such components in a metal foil bag.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLDERING METHOD FOR CABLE CONNECTORS

RIGHTS OF THE GOVERNMENT

The invention described herein may be manufactured and used by or for the Government of the United States for all governmental purposes without the payment of any royalty.

BACKGROUND OF THE INVENTION

This invention relates to a method for soldering. In particular, the invention is directed to a method for soldering objects comprising heat-sensitive components.

With all things electronic, there are always a few hitches, glitches and compromises. In many electronics installations. bundles of cables are employed to carry signals from one point to another. Signal-carrying cables, or signal cables. are generally shielded to prevent interference from external electromagnetic fields. A strong electromagnetic field can build high charges on the cable's shielding. If these charges encounter resistance. signal interfering electric fields of thousands of volts can be produced. An area of critical concern is the joint between the cable's wire shielding braid and the cable's terminal connector. These joints cannot be soldered by hand because of the tight bundling of cables. These joints cannot be dip soldered because the terminal connector, as well as the cables, generally comprises heat-sensitive components which could be destroyed or at least damaged at the soldering temperature. Due to their configuration, the joints are not suitable for wave-soldering.

Accordingly, it is an object of the present invention to provide a method for soldering the shielding braid of each cable of a cable bundle to the backplane of a cable connector.

Other objects, aspects and advantages of the present invention will be apparent to those skilled in the art from a reading of the following description of the invention.

DESCRIPTION OF THE PREFERRED EMBODIMENT

Figure 1:
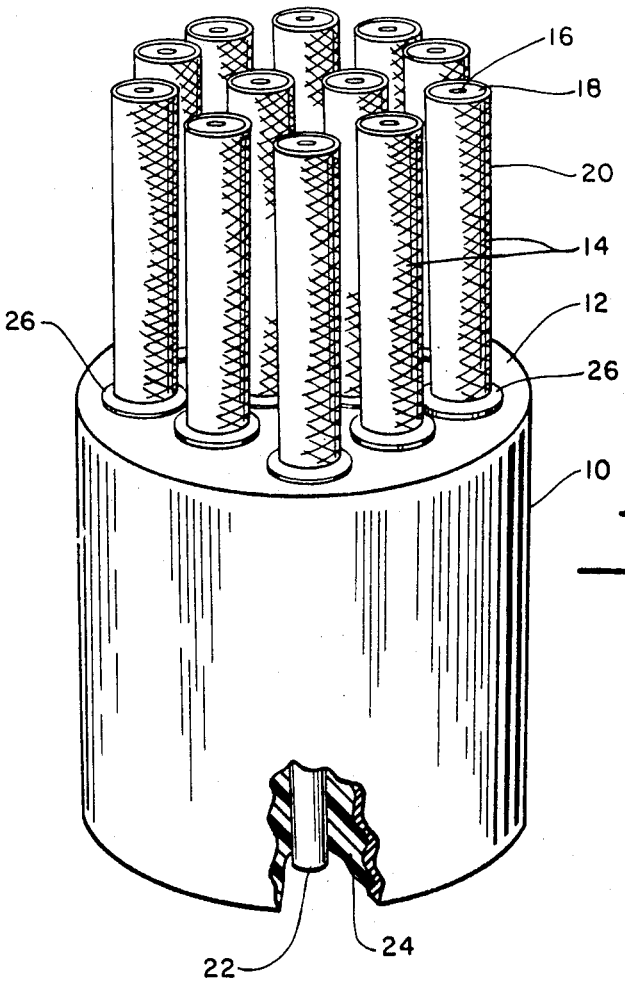
FIG. 1 is a rudimentary perspective view, partly broken away, illustratinq a plurality of shielded cables entering a cable connector.

Referring to the drawing, FIG. 1 illustrates a cable connector 10 having a cover disk 12. and a plurality of cables 14 entering disk 12. In the embodiment shown the cables 14 are coaxial cables, each comprising a center conductor 16, a concentric layer 18 of low loss polymeric dielectric and a braided outer conductor 20. The connector 10 comprises a plurality of metallic couplers 22, i.e., sockets or plugs, the couplers 22 being connected inside connector 10 to the center conductors of the cable 14, generally, one such coupler per cable. The couplers 22 are maintained in a desired configuration by a polymeric insert 24. The braid 20 of each cable 14 is soldered to the disk 12, as indicated at 26.

It will be appreciated by those skilled in the art that the cable connector 10 shown in FIG. 1 is rudimentary. that actual connectors may vary in component design: however, it will also be appreciated that the problem of soldering the cable braid 20 to the disk 12 without adversely affecting the dielectric layer 18 and the polymeric insert 24 exists regardless of the particular configuration of the connector 10.

The method of the present invention comprises the steps of assembling the cables to the connector, applying a bead of soldering paste at a desired location, wrapping the connector with a nonreactive metal foil and vapor phase soldering the assembly.

The vapor phase soldering process relies on the latent heat of vaporization of a fluid condensing from its saturated vapor phase. This phase change results in rapid and efficient transfer of energy from the vapor to a cooler product immersed in the vapor. Parts to be soldered are coated with a solder paste, then lowered into a primary zone of high-temperature vapor. As the parts contact the vapor, condensation takes place, transferring heat to the part and melting the solder. Because the vapor covers the entire surface, uniform heating is assured regardless of size or shape.

The fluids used are high boiling perfluorinated inert liquids. A series of these fluids are available from the 3M Company, St. Paul, MN, under the trademark "Fluorinert". Vapor phase soldering equipment is available from HTC, Concord, Mass. and Boron-Blakeslee, Melrose Park, Ill.

In preparation for soldering, the cables 14 are assembled with the connector 10 in accordance with procedures known in the art. A bead of the solder paste is then applied to each cable 14-disk 12 juncture.

Figure 2:
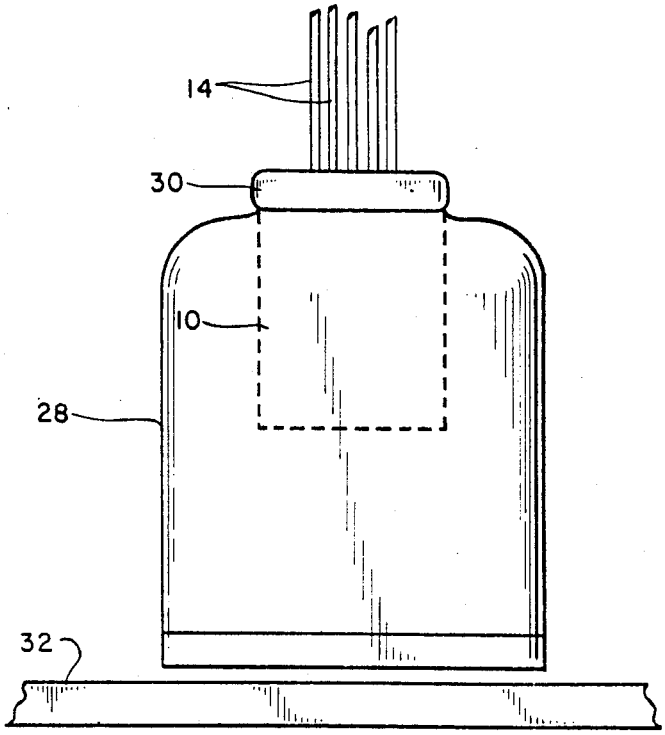
FIG. 2 is diagrammatic, illustrating the method of this invention.

Referring now to FIG. 2, a loose-fitting bag 28 made of a metal foil, such as aluminum foil, is placed over the connector 10 and the open end is secured to the connector 10 with a suitable adhesive tape 30, such as a silicon rubber tape. The bag 28 may be made by wrapping a plurality of turns of the metal foil around a suitable mandrel having a diameter which preferably is at least 1.5 times the diameter of the connector 10, removing the foil turns from the mandrel and folding over one end to close the same. The connector 10/cable 14 assembly. having the foil bag 18 secured therearound with tape 30 and having the solder paste bead applied to the cable 14-disk 12 junctures is mounted in a suitable holding fixture which is secured to the vapor phase soldering apparatus basket 32. The basket 32 carrying the part or parts to be soldered is lowered into the soldering zone of the vapor phase soldering apparatus and held there for a time sufficient to solder the braid to the disk.

EXAMPLE

A cable/connector assembly was fabricated and prepared for vapor phase soldering using a commercially available pure tin soldering Paste. An aluminum foil bag, made from Al foil about 1 mil thick was around the connector. A thermocouple was placed inside the bag. The open end of the bag was secured to the connector using 20 mil silicon rubber tape. The bagged connector was mounted to a holding fixture. A second thermocouple was located outside the bag.

Figure 3:
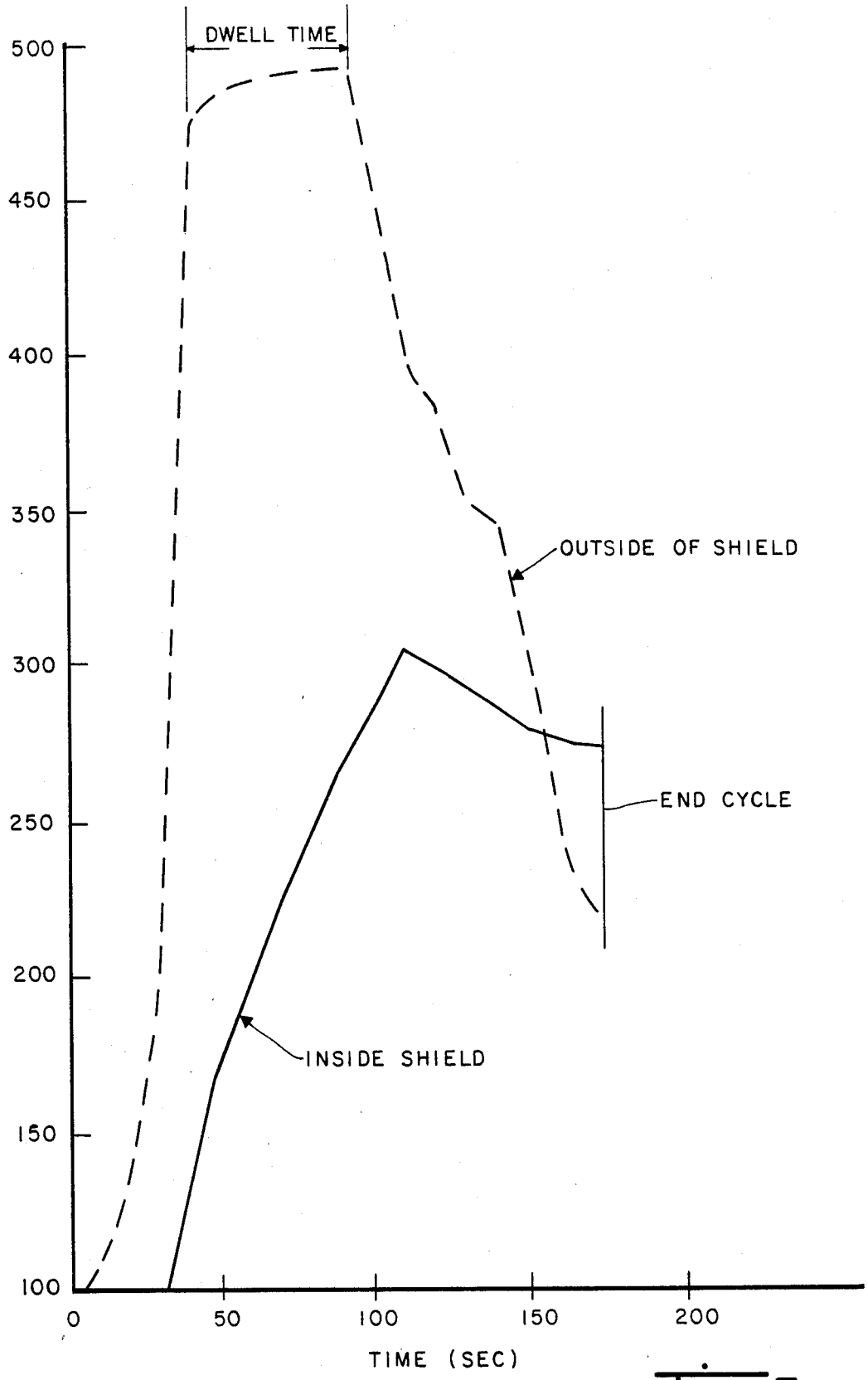
FIG. 3 is a graph illustrating the heat protection afforded by the invention.

The assembly was lowered into a vapor phase soldering apparatus containing Fluorinert FC-71, which has a vapor condensing temperature of about 250° C., for a dwell time of 50 sec. Temperature measurements were taken at 10-second intervals. As seen in FIG. 3, the ambient temperature inside of bag 28 reached a peak of about 300° F. near the end of the vapor phase soldering cycle.

While the embodiment of the present invention illustrated in the drawings has been described with particularity it will be apparent to those skilled in the art that the invention is not restricted thereto as the invention is capable of receiving a variety of expressions. and chanqes may be made in the details of the method of this invention without departing from the spirit thereof.

I claim:

1. In a method for vapor phase soldering a first solderable component to a second solderable component wherein at least one of said solderable components comprises at least one heat-degradable subcomponent, which comprises assembling said components, applying solder paste at a desired position, contacting the assembled components with a high temperature vapor to effect melting of said solder and removing the resulting soldered assembled components from said vapor, the improvement which comprises covering the said heat-degradable subcomponent with a loose fitting bag made of a metallic foil, said bag being closed at one end and secured to one of said components at the other end in such manner as to prevent entry of said high temperature vapor to the inside of said bag.

2. The method of claim 1 wherein said loose fitting bag is made of aluminum foil.

3. The method of claim 2 wherein said aluminum foil has a nominal thickness of 1 mil.

* * * * *